United States Patent [19]

Bolsing et al.

[11] 3,897,238

[45] July 29, 1975

[54] METHOD OF UNIFORMLY DISTRIBUTING SUBSTANCES IN A CARRIER MATERIAL AND PULVEROUS CARRIER MATERIAL

[76] Inventors: Friedrich Bolsing, Bahnhofstr. 3, 4965 Lindhorst; Heinrich Mencke, Diepensiepen 47, 5601 Gruiten, both of Germany

[22] Filed: Oct. 26, 1971

[21] Appl. No.: 192,333

[30] Foreign Application Priority Data

Oct. 31, 1970 Germany.............................. 2053627

[52] U.S. Cl. ..................................................... 71/3
[51] Int. Cl. ...................................................... A01n
[58] Field of Search ......... 71/3, 4, DIG. 1; 424/158, 424/159, 160

[56] References Cited
UNITED STATES PATENTS

| 1,958,102 | 5/1934 | Goldsworthy | 424/159 |
| 2,343,360 | 3/1944 | Arnold | 424/159 |
| 3,024,161 | 3/1962 | McAllister | 424/160 |
| 3,056,723 | 10/1962 | Galloway | 71/DIG. 1 |
| 3,585,022 | 6/1971 | Gray, Jr. | 71/67 |
| 3,617,246 | 11/1971 | Dryfjes | 71/79 |
| 3,667,929 | 6/1972 | Fleming, Jr. | 71/67 |

*Primary Examiner*—James O. Thomas, Jr.
*Attorney, Agent, or Firm*—Burgess, Dinklage & Sprung

[57] ABSTRACT

A method of uniformly distributing substances in a carrier material characterized primarily by mixing a compound, which forms the carrier material by means of a chemical reaction, with the substance to be intermixed with the carrier material, and subsequently treating the mixture with a compound which reacts with the carrier material forming compound to form the carrier material while increasing the specific surface and maintaining a pulverous state.

2 Claims, No Drawings

METHOD OF UNIFORMLY DISTRIBUTING SUBSTANCES IN A CARRIER MATERIAL AND PULVEROUS CARRIER MATERIAL

The present invention relates to a method of uniformly distributing substances in a carrier material, and in particular, of distributing solid or liquid substances in a pulverous carrier material.

For uniform distribution of solid or liquid materials in a solid carrier material, mechanical mixing or milling methods are predominantly used, for which special dispersing and milling apparatus are available.

These common pulverizing methods, however, have a number of disadvantages. As is well known, the resistance to milling increases as the grain size of the material to be milled decreases, so that after attainment of a certain fineness, the material may no longer be milled, on the contrary, it may sometimes even agglomerate again. Further, relatively high energy consumption is common to all milling and mixing methods. Finally, these type methods are entirely unsuitable for distributing or dividing moist or pasty material in a pulverous material, since then lumps form which prevent a homogeneous distribution. Thus it is, for example, possible only with great difficulties to uniformly mix mineral or other oils, bituminous substances or melted paraffins or the like with pulverous materials or to uniformly distribute lubricating or adhesive substances in pulverous carrier materials.

It is an object of the present invention to provide an improved and simplified method of uniformly distributing substances in a carrier material, and especially solid or liquid substances in a pulverous carrier material, while the degree of distribution will substantially be more uniform and the division will substantially be more refined than has been realized heretofore by grinding or milling.

With this object and other objects and advantages in mind, the method according to the present invention is characterized primarily by mixing a compound which forms the carrier material and is obtained by means of a chemical reaction — which compound will hereafter be called carrier material prestage — with the respective substance, and subsequently treating the mixture with a compound which reacts with the carrier material prestage while increasing the specific surface and maintaining the pulverous state as well as forming the carrier material.

The compound, with which the mixture is treated, is preferably added stoichiometrically to the compound which forms the carrier material.

A compound especially suitable according to the invention is water, which reacts with numerous substances in the stated manner.

Water reacts with numerous compounds to form hydroxides, whose surfaces are larger than those of the initial materials, in which connection the solid and pulverous states are maintained. Examples of such compounds are aluminum carbide $Al_4C_3$, calcium carbide $CaC_2$, calcium oxide $CaO$, magnesium oxide $MgO$, and magnesium nitride $Mg_3N_2$, which react as carrier material prestages with water according to the following formulas:

$$Al_4C_3 + 12 H_2O \rightarrow 4 Al(OH)_3 + 3 CH_4$$
$$CaC_2 + 2 H_2O \rightarrow Ca(OH)_2 + C_2H_2$$
$$CaO + H_2O \rightarrow Ca(OH)_2$$
$$MgO + H_2O \rightarrow Mg(OH)_2$$
$$Mg_3N_2 + 3 H_2O \rightarrow 3 MgO + 2 NH_3 \rightarrow Mg(OH)_2$$

The respective hydroxides are then the carrier material proper.

A relatively simple method of mixing is sufficient during the predistribution or during blending of the carrier material prestage into the substance (or vice versa). The fine division according to the invention is brought about by means of the subsequently occurring chemical reaction.

A prerequisite for accomplishing the method according to the invention is that the substance and the carrier material prestage or the carrier material do not chemically react with one another, at least not before the predistribution. Further, the substance should preferably be in a liquid or viscous-plastic form. In the case of a solid substance, it is advantageous to dissolve this substance in a solvent which is inert to the carrier material prestage and the carrier material; or, in the case of an easily meltable compound, to melt the substance. Pulverous or crystalline substances may be used directly, as long as they melt or sublime by the heat of reaction.

The following examples serve to more clearly illustrate the invention and its field of application.

EXAMPLE 1

56 parts by weight milled quicklime are gradually and with constant stirring distributed in 40 parts by weight of a liquid tar, in which connection a commercial sized laboratory mixer is used. The viscous, black mixture has numerous little lumps and clods; that is, the distribution of the quicklime in the tar is imcomplete. Now, while the mixture of quicklime and tar is further stirred, 18 parts by weight of water is added. The resulting black, viscous mass is left alone. After about 15 minutes the reaction between quicklime and water sets in with expansion and swelling. After another 15 minutes it has ended. Out of the viscous mass there is by this means produced a solid, porous cake, which easily crumbles into a fine, black powder. Inhomogeneities are no longer recognizeable in this powder.

The nondusty powder is suitable, because of its intensive, unpleasant tarry smell, particularly as feed protection means for young seeds, which means that it reliably and without injuring the growth keeps away all types of seed parasites. Moreover, because of the lime content, the powder serves as a fertilizer.

EXAMPLE 2

56 parts by weight milled quicklime are stirred into a melt consisting of 3 parts by weight stearic acid (melting point 69.3°C), 10 parts by weight paraffin oil, and 10 parts by weight dichlorodiphenyltrichloroethane (melting point 109°C). After cooling, an inhomogeneous granulated material exists, to which 18 parts by weight water are now added. After several minutes the reaction, which is recognizable by the appearance of expansion, sets in. After the reaction has ended, an extremely fine powder is obtained. Appropriate tests have shown that the dichlorodiphenyltrichloroethane is distributed exceptionally homogeneously in the carrier material. The powder has excellent insecticide properties.

EXAMPLE 3

2 parts by weight paraffin oil are mixed with 50 parts by weight coarse quicklime. Stirring lightly, 18 parts by weight water is added to the mixture. After about 10 minutes a nondusty powder is produced, in which the paraffin oil is homogeneously distributed. The powder is particularly suitable for precipitating hydrophobic or water repellent materials out of water, for example, oil films out of water or synthetic material dispersions out of drainage from the treatment or processing of synthetic materials.

The paraffin oil in the calcium hydroxide powder brings about in this connection the adhesion of the hydrophobic material to the calcium hydroxide powder. The latter has such a large specific surface that the hydrophobic material may be absorbed and precipitated.

EXAMPLE 4

5 parts by weight quicklime is stirred to a paste with 1.5 parts by weight paraffin oil and 0.3 parts by weight of commercially obtainable fatty amines. The mixture is reacted with 1.8 parts by weight water. The nondusty powder obtained is suitable as anticaking means, for example in the fertilizer industry.

It is, of course, to be understood that the present invention is, by no means, limited to the specific examples but also comprises any modifications within the scope of the appended claims.

What is claimed is:

1. A method of forming a pulverulent mixture of an oily or bituminous material and the hydroxide of calcium, magnesium or aluminum, which comprises mixing said oily or bituminous material with the oxide, carbide or nitride of calcium, magnesium or aluminum, and contacting said mixture with approximately the stoichiometric amount of water required to form calcium, magnesium or aluminum hydroxide thereby to form said hydroxide, the resulting hydroxide being characterized by a large surface area and being substantially homogeneously mixed with said oily or bituminous material.

2. The method of forming an insecticidal composition according to claim 1, wherein the oily or bituminous material is mixed in about 3 to about 54% by weight of the hydroxide.

* * * * *

UNITED STATES PATENT AND TRADEMARK OFFICE
Certificate

Patent No. 3,897,238                                                    Patented July 29, 1975

Friedrich Bolsing & Heinrich Mencke

Application having been made by Friedrich Bolsing and Heinrich Mencke, the inventors named in the patent above identified, and Rheinisch Westfalische Kolkwerke AG, Bezirk Dusseldorf, Germany, the assignee, for the issuance of a certificate under the provisions of Title 35, Section 256, of the United States Code, deleting the name of Heinrich Mencke as a joint inventor, and a showing and proof of facts satisfying the requirements of the said section having been submitted, it is this 27th day of October 1981, certified that the name of the said Heinrich Mencke is hereby deleted from the said patent as a joint inventor with the said Friedrich Bolsing.

Fred W. Sherling
*Associate Solicitor.*